United States Patent [19]

Burnette

[11] Patent Number: 4,780,072

[45] Date of Patent: Oct. 25, 1988

[54] APPARATUS FOR INTERNALLY COATING WELDED PIPE AT THE WELDMENT

[76] Inventor: Robert W. Burnette, 11513 Echo Hollow, Houston, Tex. 77024

[21] Appl. No.: 697,473

[22] Filed: Feb. 1, 1985

[51] Int. Cl.[4] .................. B29C 33/34; B29C 39/26
[52] U.S. Cl. .................... 425/62; 118/205;
  118/306; 118/408; 425/87; 425/117; 425/129
  R; 425/405.1; 425/417; 425/457; 425/460;
  425/129.1
[58] Field of Search .............. 425/110, 87, 129 R,
  425/405 R, 417, 457, 458, 97, 422, 460, DIG.
  14, 62, 405.1, 420, 117; 264/269, 270; 249/65,
  178, 184; 118/408, 669, 306, 205, 206, DIG. 10;
  29/460, 527.2,

[56] References Cited

U.S. PATENT DOCUMENTS

| | | | |
|---|---|---|---|
| 1,505,004 | 8/1924 | Delamare | 425/447 |
| 2,140,298 | 12/1938 | Miller | 91/30 |
| 2,399,321 | 4/1946 | Butler | 25/38 |
| 2,908,248 | 10/1959 | Brant | 118/408 |
| 3,017,855 | 1/1962 | Ranker | 118/306 |
| 3,022,765 | 2/1962 | Xenis | 118/669 |
| 3,055,339 | 9/1962 | Pistole et al. | 118/408 |
| 3,269,421 | 8/1966 | Telford et al. | 118/408 |
| 3,315,017 | 4/1967 | Kemp | 264/36 |
| 3,568,721 | 3/1971 | Ross | 138/97 |
| 3,853,299 | 12/1974 | Kessel | 249/178 |
| 3,894,131 | 7/1975 | Speech | 264/45.2 |
| 3,927,360 | 8/1976 | Mihaly | 118/408 |
| 4,092,950 | 6/1978 | Hart | 118/669 |
| 4,153,656 | 5/1979 | Bunyan | 264/40.1 |
| 4,240,775 | 12/1980 | Berni | 425/110 |
| 4,340,010 | 7/1982 | Hart | 118/306 |
| 4,357,745 | 11/1982 | Chlebowski | 29/460 |
| 4,360,961 | 11/1982 | Chlebowski | 29/460 |
| 4,362,291 | 12/1981 | Fuke et al. | 249/184 |
| 4,383,819 | 5/1983 | Letica | 249/184 |
| 4,389,180 | 6/1983 | Gordon | 249/184 |
| 4,413,655 | 11/1983 | Brown | 138/97 |
| 4,421,698 | 12/1983 | Vanderlians | 249/65 |
| 4,532,151 | 7/1985 | Stenlund | 118/408 |
| 4,541,605 | 9/1985 | Kubota et al. | 249/184 |

FOREIGN PATENT DOCUMENTS

| | | |
|---|---|---|
| 0167421 | 1/1986 | European Pat. Off. . |
| 3415561 | 11/1985 | Fed. Rep. of Germany ...... 249/178 |
| 992388 | 10/1951 | France . |
| 7824642 | 3/1980 | France . |
| 1389212 | 4/1975 | United Kingdom ............. 249/178 |
| 2094915 | 9/1982 | United Kingdom . |

OTHER PUBLICATIONS

Japanese Patent Abstract No. 52-43125, "Local Repair Technique and Device for A Buried Pipe" Kanemoto.

Primary Examiner—Willard E. Hoag
Attorney, Agent, or Firm—Arnold, White & Durkee

[57] ABSTRACT

Apparatus is disclosed for fabricating an internally coated pipeline for transporting corrosive and/or erosive materials in which the pipe sections are joined by welding. The pipe sections are first internally pre-coated to the exclusion of a length at each end that is affected by the heat of welding the sections together. After the weld has been made between adjacent pipe sections, an expansible and retractable mold is positioned in the area of the weld joint to define an injection cavity between the pre-coating ends. A coating material is injected into the cavity. The mold can then be retracted and moved to another weld joint where the process is repeated.

16 Claims, 5 Drawing Sheets

APPARATUS FOR INTERNALLY COATING WELDED PIPE AT THE WELDMENT

FIELD OF THE INVENTION

This invention relates generally to methods and apparatus for internally lining welded pipe joint connections with abrasion and/or corrosion resistant materials, and particularly to new and improved processes and apparatus for placing a short length of liner material inside a previously formed weld seam at the ends of two adjacent pipe sections in a manner such that the entire inner surface of the pipe can be protected against abrasion from the passage of slurries or the like and/or corrosion by passage of acidic or salty fluids, and to a product made by the process.

BACKGROUND OF THE INVENTION

Pipelines that are used to transport slurries (water and solids) need to be protected against internal erosion, particularly when certain types of slurries are being transported. A known method of effecting protection against erosion is to line the pipe joints internally with a urethane elastomer, natural rubber, or other abrasion resistant plastic material, in thicknesses that range from 0.25 inches to more than 1.00 inch. The customary practice has been to line the pipe in a shop in lengths of 10 to 40 feet or more, and to utilize welded-on flanges at the pipe ends to enable them to be joined together in the field to construct a pipeline. To prevent damage to the internal urethane coating due to the heat effects of welding, the flanges are welded to the pipe ends prior to application of the internal coating. Thus, prior practices did not permit field welding of individually lined pipe sections, which is a much more desirable procedure than the practices outlined above, and required the use of flanges which are expensive and time consuming to install.

The present invention provides a new and improved process and apparatus for internally coating pipes without the use of flanges and permitting field welding of individually lined pipe sections in order to construct a pipeline. This is accomplished by lining the weldment areas of the pipeline after welding is completed.

SUMMARY OF THE INVENTION

According to a method aspect of the invention, the method includes the steps of pre-coating two pipe sections without flanges, with the pre-coating being held back a selected distance from each end of the pipe in order to exclude the pre-coating from the heat-affected zone when the pipe ends are welded together. The distance the pre-coating is held back is determined by the heat resistance of the particular coating material being used, and may be from 3 to 6 inches. The process may include the step of using a disposable plastic profile piece that defines the shape or configuration of the ends of the pre-coating to enhance bonding of a subsequently applied coating inside the region of the weld joint. The disposable pieces can remain inside the ends of each pipe section until it is ready to be welded in order to protect the end surfaces of the pre-coating and the uncoated inner surface of the pipe end. This feature permits long term storage of pipe and its transportation and handling after pre-coating in the shop without degrading the quality or effectiveness of the finished product.

Adjacent pipe sections are joined by welding. To exclude weld debris from the pipeline interior and to further enhance the bonding of the subsequently applied coating, welding may be carried out using backup rings. After welding is complete, a heating element with an insulation jacket should be installed on the outside of the pipe to raise and maintain its temperature to about 200° F. for the injection step to follow.

The final coating or lining of the pipe in the vicinity of the weld joint is attained through use of an expansible and retractable mold apparatus that expands radially outward against the previously applied pre-coating in a manner to completely enclose and define an annular space between the internal diameter of the uncoated portion of the pipe in the weld area, the outer surface of the mold apparatus itself, and the ends of the pre-coating. The mold apparatus may be expanded and contracted by mechanical, hydraulic, or pneumatic means.

Sealing devices are provided around the periphery of the mold apparatus to enhance the forming of the previously described annular void space. Such devices may be compressible elastomer seals, knife edge hard metal or non-metallic seals, or inflatable seal rings extending around the mold. These sealing devices provide a tight seal while accommodating variations in pipe size within manufacturig tolerances. In addition, the expansible mold apparatus itself has the highly desirable feature of a slightly variable diameter in order to accomodate manufacturing tolerances in the pipe and its lining.

Once the seals are made, the process is preferably carried out by the further steps of evacuating the weld area and expanding the mold apparatus against the internal diameter of the coated pipe. With the apparatus expanded and sealed, a coating material is injected into the annular region. Since the annular space to be coated is under vacuum, the space is completely filled with coating material. A pressure sensor may be used to sense a pressure increase as the cavity is completely filled, and to signal cut-off of material injection. After a curing period, the mold apparatus is retracted, leaving a coating or liner material that is continuous and which covers the entire inner periphery of the pipe.

Thus, the product produced by the foregoing process is a plurality of pre-coated pipe sections that are welded end to end, and which have short liner sections implaced inside the weld joints which provide a continuous coating for the pipeline. The use of flanges is eliminated, resulting in a less expensive pipeline installation which is more reliably internally coated with an errosion and/or corrosion resistant material.

The apparatus of the present invention comprises an expansible and retractable mold assembly adapted to be positioned inside a pipeline at the weld joint between adjacent pipe sections to define an annular injection cavity. Valve means is provided for coating material injection into the annular region. Both the mold and valve means are preferably heated to about 200° F. to provide the correct environment for the coating material to be injected. Preferably, the assembly also has seals mounted at opposite ends so that the weld area can be sealed from the remainder of the pipeline and the weld area evacuated to facilitate injection.

The assembly may include a power unit having a urethane mixer which may be of the mechanical, impingement, or static type, a waste tank, motivating power and retractable wheels. Hoses are employed for connection to a mobile unit which supplies chemicals, solvents, compressed air, vacuum former, and hydraulic and electrical power for mold heating and instrumentation.

The mold assembly preferably is retractable to a size such that is can be moved around bends in the pipeline, which can be field-formed to a radius as small as 20 times the outside diameter of the pipe for pipe sizes up to 36.0 inches O.D. or to a radius of 60 feet for larger pipe sizes.

In one embodiment, the mold assembly has six mold segments each mounted on hydraulically actuated cylinders. Three of the segments are larger than the others, with each of these segments subtending an angle of approximately 100° of the surface of the cylinder. The longitudinal edges of each of these segments are beveled to facilitate the sealing of the mold apparatus when expanded. The three smaller segments each subtend an angle of about 20°, and the longitudinal edges of these smaller segments are beveled to match the bevels of the edges of the larger segments. When a weld joint coating operation has been completed, the mold assembly and its seals are retracted so that the device can be removed from the pipeline, or moved to the next joint coating location.

It is an advantage of the present invention that an internally coated pipeline for transportation of corrosives and/or erosives is provided which does not require flanges to connect adjacent pipe sections.

Another advantage of the present invention is that an apparatus and method are provided to internally coat discrete areas of the inside of a pipeline in the area of a weld after adjacent pipe sections have been joined by welding.

A further advantage of the present invention is that an internally coated pipeline for transporting corrosives and/or erosives may be inexpensively manufactured and assembled.

DETAILED DESCRIPTION OF A PREFERRED EMBODIMENT

Figure 1:
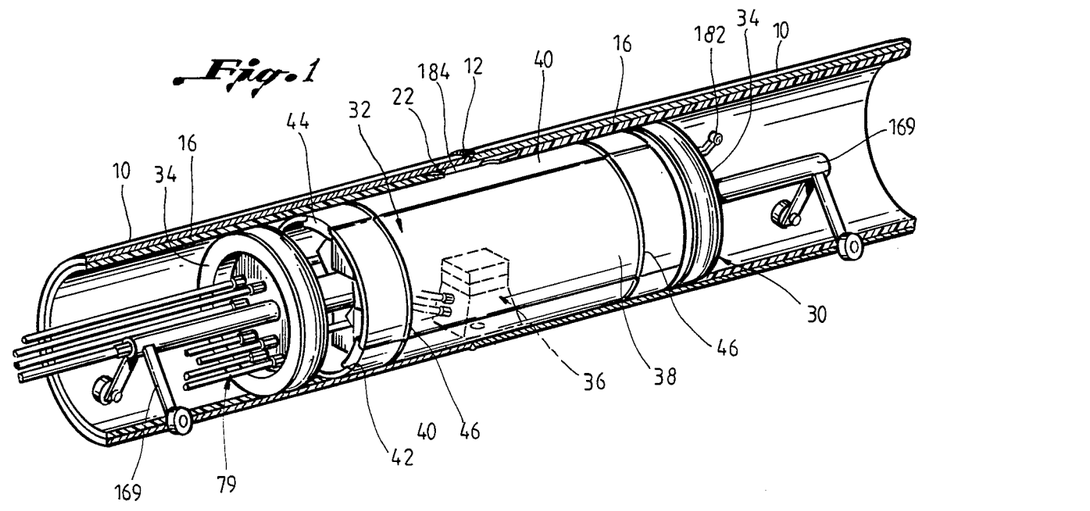
FIG. 1 is a perspective sectional view of a pipeline weld joint area showing somewhat schematically the apparatus of the present invention positioned therein.
Figure 2:
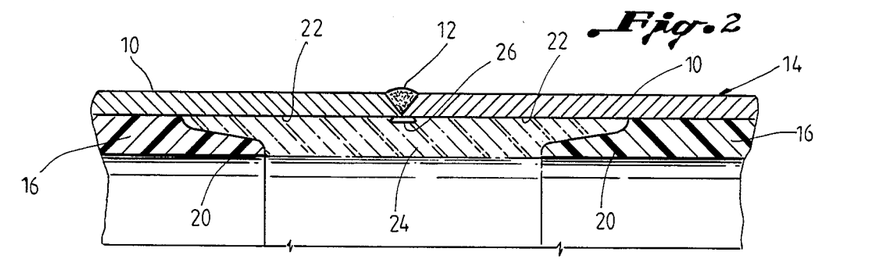
FIG. 2 is a partial sectional view through the weld area of a pipeline made in accordance with the present invention.
Figure 3:
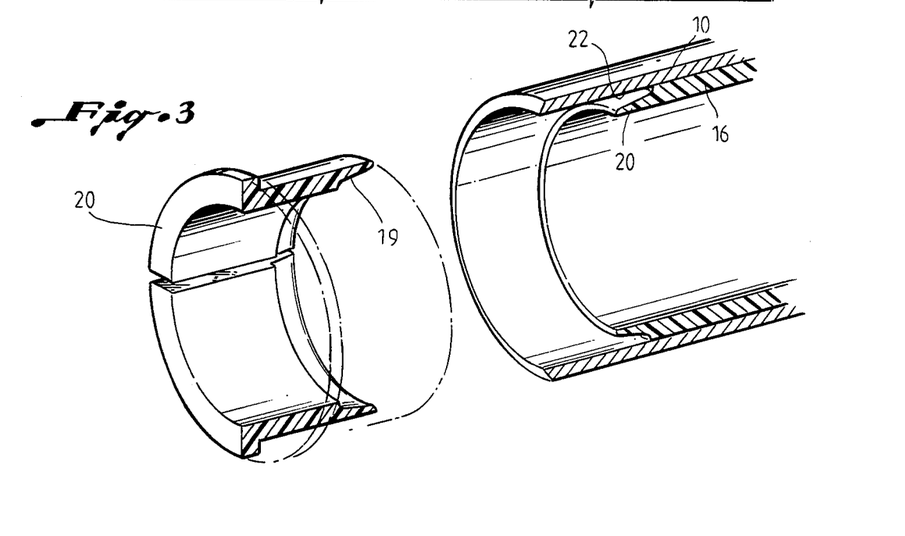
FIG. 3 is a perspective sectional view of the pre-coating of a pipe section and a disposable profile piece.

Referring initially to FIGS. 1 and 2, two sections of pipe 10 are shown joined by a weld 12 to form a pipeline 14. Each of the pipe sections has a layer of internal pre-coating 16 to provide protection against erosion or corrosion due to the passage of slurries of water and solids or corrosives being pumped through the line. This coating can be, for example a urethane having properties designed for maximum erosion and corrosion protection, depending upon the material being transported. The urethane pre-coating is applied in the shop using a conventional process such as spin casting. However, the pre-coatings 16 are terminated a selected distance, usually about three to six inches, from the pipe end such that the coatings, and their bond to the pipe, are not deteriorated or otherwise damaged by heat generated during the welding process. This may be accomplished by placing a disposable plastic profile piece 18 inside each end of the pipe sections 10 during the shop casting process as shown in FIG. 3. Each profile piece 18 presents a profile face 19 which provides a desired end profile for pre-coatings 16.

In a preferred form of the present invention, the ends of the pre-coatings 16 adjacent the pipe end where the weld is to be formed are molded with a configuration that includes an inner, outwardly extending lip 20 which provides a vacant region between it and the inner wall surface 22 of the pipe. Profile pieces 18 remain on the pipe ends after the pre-coating 16 are applied in the shop until the welds are made in the field in order to protect the inner surface from corrosion during long term storage and transportation.

Prior to welding, disposable pieces 18 are removed. Preferably, the pipe and urethane surfaces are cleaned with a suitable solvent. The ends of the pre-coating may then be lightly abraded and/or coated with an adhesive to provide better bonding with the later injected coating material.

To assemble pipeline 14, two sections of pipe 10 are positioned end to end, and a typical welding machine is used to form the weld 12. Welding may be carried out with specially configured backup rings 26 to exclude weld debris from the pipe interior and to enhance bonding of the weld joint coating. After welding is completed, an expansible mold apparatus 30 is used to apply a weld area coating section 24 at each weld area so that the internal coating of the pipeline is continuous. The pipe, mold, and injection system should be heated to a processing temperature of about 200° F. during the injection process as previously described.

Figure 4:
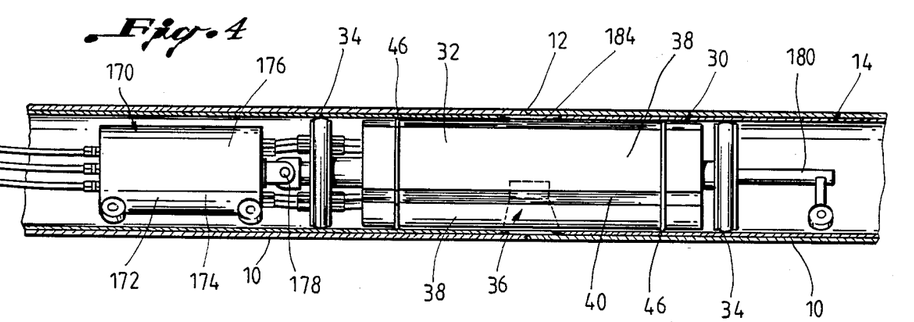
FIG. 4 is a sectional view through the weld area of pipeline, with the apparatus of the present invention, including an attached mobile unit, positioned therein.

As shown in FIGS. 1 and 4, apparatus 30 includes a plurality of mold segments 32 that are individually expansible and retractable and which together form a generally cylindrical mold. A packer 34 is provided at each end of the unit and is adapted to be expanded by the introduction of compressed air or the like so as to seal off the interior of the pipe between the packers. This volume can then be evacuated through operation of a suitable vacuum pump to a vacuum of preferably more than 750 mm mercury, which is held during the coating operation to be described below. After the proper vacuum is obtained, the mold assembly is expanded against the internal diameter of the pre-coatings 16 as shown in FIGS. 1 and 4 and urethane is injected by an injection valve 36 to create weld area coating section 24 shown in FIG. 2. Alternatively, a vacuum could be pulled after the mold assembly has been expanded.

The plurality of mold segments 32 of apparatus 30 preferably comprise a plurality of large mold segments 38 arranged in alternating relationship with a like plurality of small mold segments 40. Various numbers of large and small mold segments 38, 40 may be used. For most applications, however, three large mold segments and three small mold segments may be used to provide a mold for forming weld area coating section 24. It has been found that this number permits retraction of the mold to a size capable of negotiating field bends in the pipeline.

A set of large and small mold segments 38, 40 will be needed for each diameter of pipe to be coated. In slurry pipe applications, for example, it is contemplated that most applications will be for 12-inch to 20-inch diameter pipe. Thus, a limited number of interchangeable mold segments will be needed for use with apparatus 30.

Preferably, mold segments 38, 40 are made of aluminum or steel and have an electroless nickel or other similar finish for smoothness so that the injected urethane does not stick to it. Alternatively, the surface of the mold segments may be sprayed with a commercially available mold release material such as a wax or silicone coating to prevent sticking. Any smooth surface will do which prevents sticking of the urethane.

Figure 8:
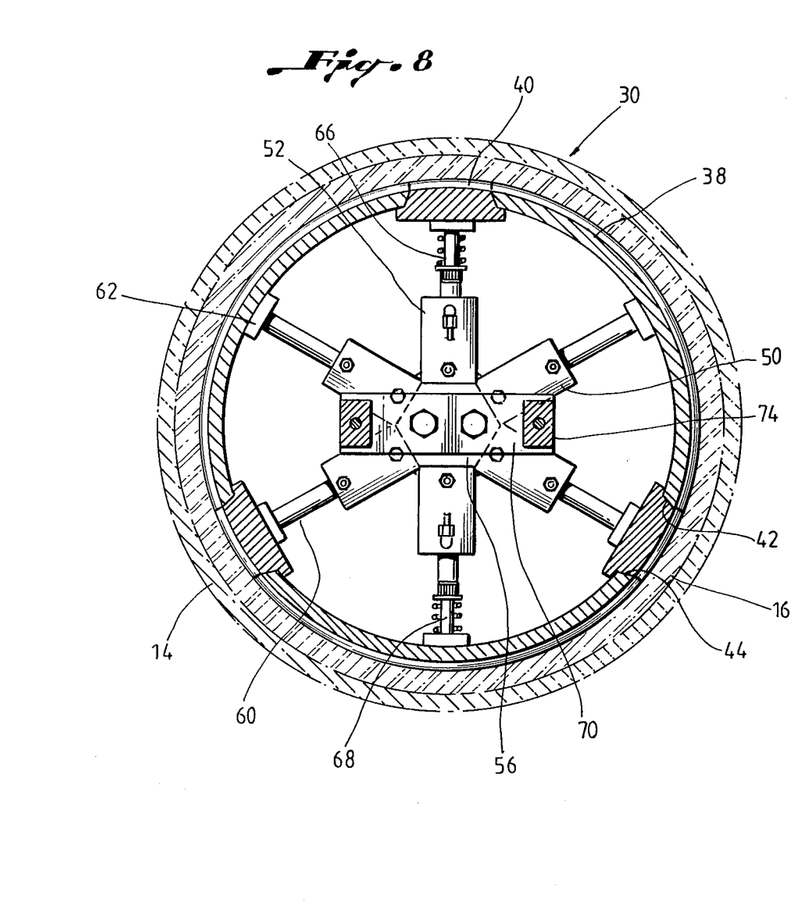
FIGS. 8 and 8A are sectional views taken along line 8 of FIG. 7 showing the mold segments in the expanded and retracted positions, respectively.

Preferably, large mold segments 38 subtend an angle of approximately 100°. In the expanded configuration, large mold segments 38 and small mold segments 40 together form a complete cylinder as seen in FIGS. 1, 4, and 8. Bevels 42 on the large mold segments sealingly cooperate with bevels 44 on the small mold segments. To ensure that no gaps will be present between the pre-coating 16 and mold segments 38, 40 due to ovality or manufacturing tolerances in the pipe or pre-coating in the diameter of pipe segments 10, each mold segment 38, 40 is preferably provided with a sealing strip 46 located at each end in grooves 48 on the outer surface of the mold segment. Sealing strips 46 provide an additional seal against leakage of urethane injected into the weld area. Sealing strips 46 are located on opposite sides of the weld area and can withstand a pressure of approximately 300 to 400 psi. Preferably, the sealing strips are made of elastomer.

Bevels 42, 44 permit small mold segments 40 to act like a keystone in an arch so that the forces on the mold segments due to material injection can be substantially carried by the small mold segments.

Figure 7:
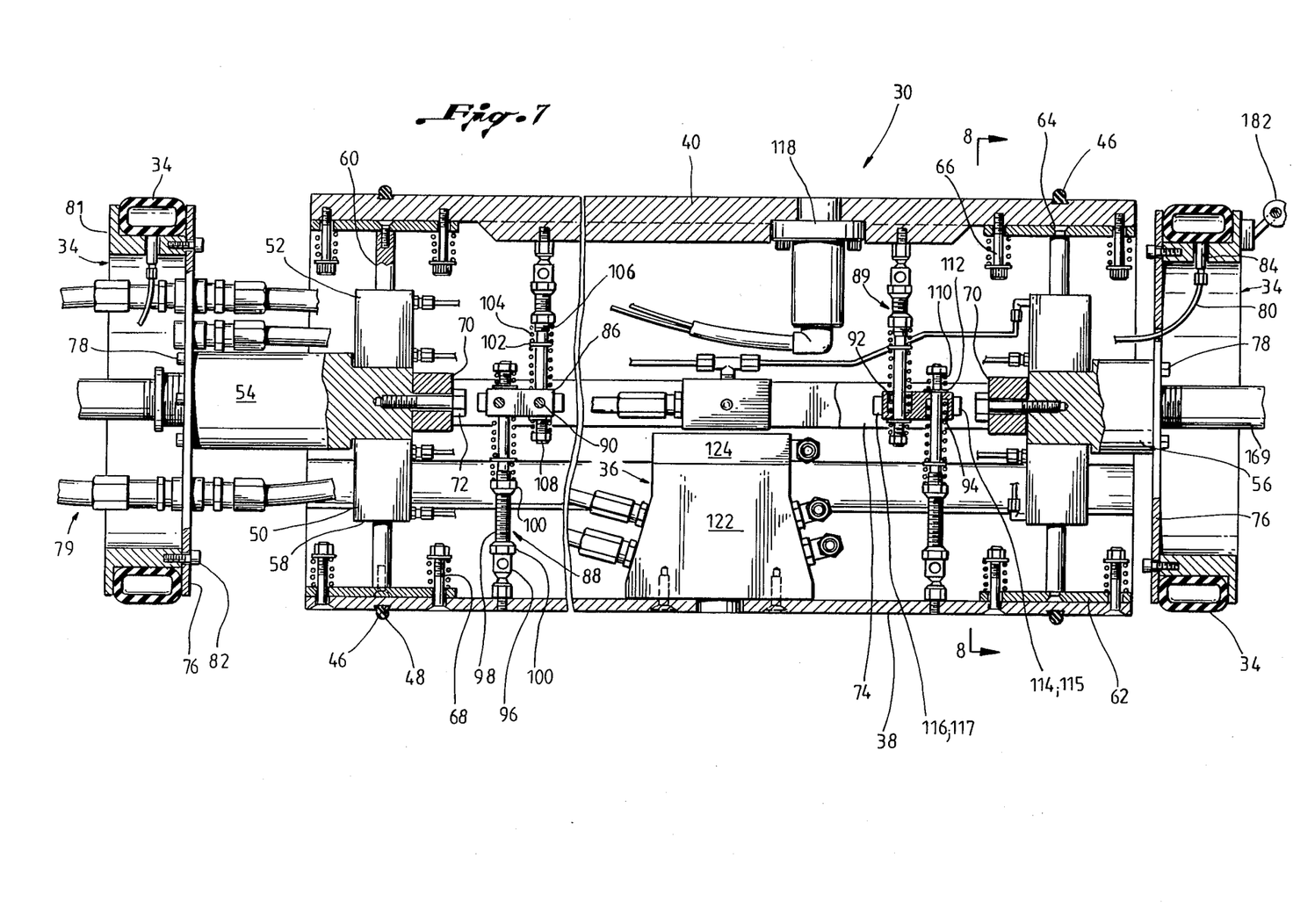
FIG. 7 is a longitudinal cross-section through the mold apparatus.
Figure 8A:
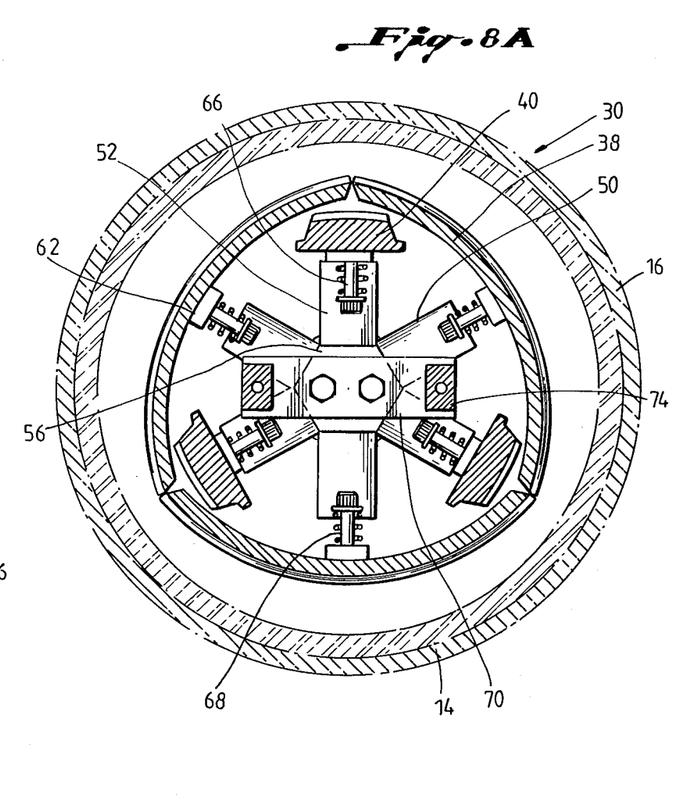

As shown in FIGS. 7, 8, and 8A, a double acting cylinder 50 extends from the center of apparatus 30 out to each end of large mold segments 38. Similarly, a double acting cylinder 52 extends radially outward from the center of apparatus 30 to each end of each small mold segment. Cylinders 50, 52 are mounted on a long cylinder mount base 54 at one end of apparatus 30 and a small cylinder mount base 56 at the other end by two socket head cap screws 58. The long mount base 54 is necessary to provide enough space for the various hydraulic, coating supply, and pneumatic hoses and electrical lines entering apparatus 30.

A piston rod 60 extends radially outward from each cylinder to its associated mold segment. Mounted on the end of each piston rod is a spring plate 62. Each spring plate 62 is mounted on its associated piston rod 60 by a flat head cap screw 64. Small mold segments 40 are in turn held against spring plates 62 by a hex socket shoulder screw, washer, and spring assembly 66. Large mold segments 38 are likewise held against spring plates 62 by a flat head cap screw, nut, washer, and spring assembly 68. Assemblies 66, 68 permit slight misalignments of the mold segments due to uneven inward and outward movement of piston rods 60, and also make mold segments 38, 40 self-aligning when expanded.

A spreader bar 70 is bolted to the inside end of each cylinder mount base 54, 56 by two hex head bolts 72. In turn, a pair of connecting bars 74 are bolted to and extend between spreader bars 70. A packer plate 76 is bolted to the outside end of each of cylinder mount bases 54, 56 by socket head cap screws 78. Packer plate 76 bolted to long cylinder mount base 54 has a plurality of penetrations extending through it for passage of the necessary hydraulic, pneumatic, and electrical lines for operation of apparatus 30. The opposed packer plate has penetrations for passage of a pneumatic line to supply packer 34.

Packer 34 is positioned on packer retainer 81 which is bolted to packer plate 76 by a plurality of socket head cap screws 82. An aperture 84 in packer retainer 81 accommodates an air valve for packer 34.

Positioned between connecting bars 74 are a pair of mounting brackets 86. Each mounting bracket 86 supports two oppositely directed limit switch actuator assemblies 88, 89. Assemblies 88 are associated with large mold segments 38 and assemblies 89 are associated with small mold segments 40. Each mounting bracket 86 is connected to the connecting bars by a pair of socket head capscrews 90. Each limit switch actuator assembly 88, 89 is mounted in an aperture 92 which extends through mounting bracket 86. Apertures 92 have a large diameter portion 94.

Each actuator assembly 88, 89 includes a damper control swivel 96 which is threaded into the associated mold segment and a linkage 98 threaded into the swivel. A pair of nuts 100 are threaded onto each linkage 98. A washer 102 is positioned on the linkage between two springs 104, 106. A nut 108 is threaded onto the opposite end of linkage 98 and retains a spring 110 and washer 112. An expansion limit switch 114 and a retraction limit switch 115 are mounted on mounting bracket 86 and associated with each limit switch actuator assembly 88. Likewise, an expansion limit switch 116 and retraction limit switch 117 are mounted on mounting brackets 86 and associated with limit switch actuator assemblies 89.

A pressure transducer 118 is mounted in a small mold segment 40 and communicates to the outside surface of the mold segment. An injection valve assembly 36 is mounted in a large mold segment 38. The assembly includes a valve body 122 and a valve cap 124 bolted to the valve body.

Figure 5:
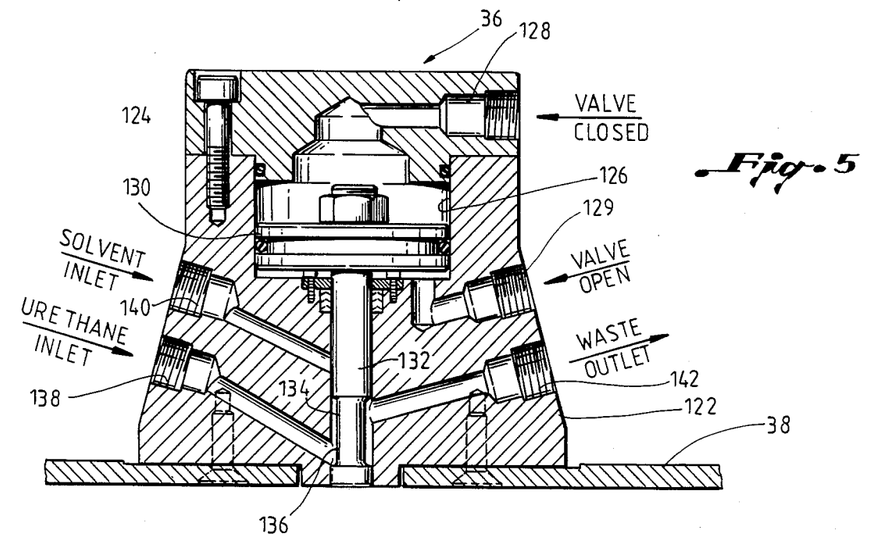
FIGS. 5 and 6 are sectional views through the injection valve of the apparatus of the present invention in the closed and open positions, respectively.
Figure 6:
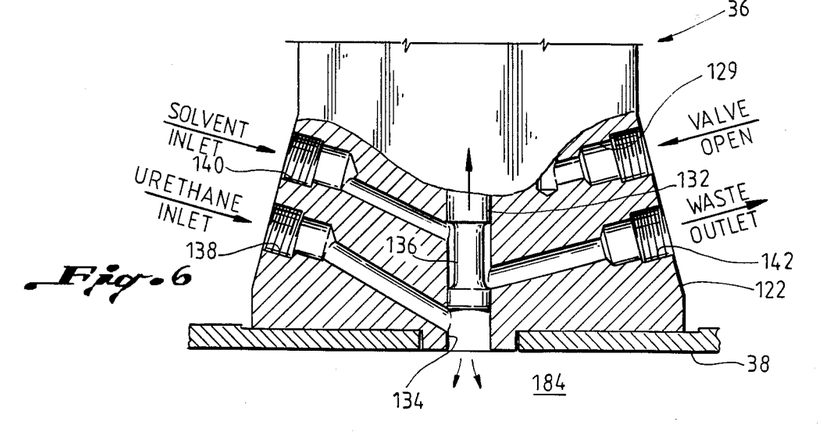

Referring to FIGS. 5 and 6, the valve body and valve cap 122, 124 define a hydraulic cylinder 126. A top hydraulic fluid inlet 128 and a bottom hydraulic fluid inlet 129 extend through the valve cap 124 and valve body 122, respectively, into hydraulic cylinder 126. A piston 130 is positioned reciprocatingly in hydraulic cylinder 126.

Extending downwardly from piston 130 is a spool 132. It reciprocatingly resides in a central passage 134 which communicates out through large mold segment 38. Spool 132 has a smaller diameter central neck section 136. Extending through valve body 122 into central passage 134 is a castable urethane supply passage 138, a solvent supply passage 140, and a waste removal passage 142.

Figure 9:
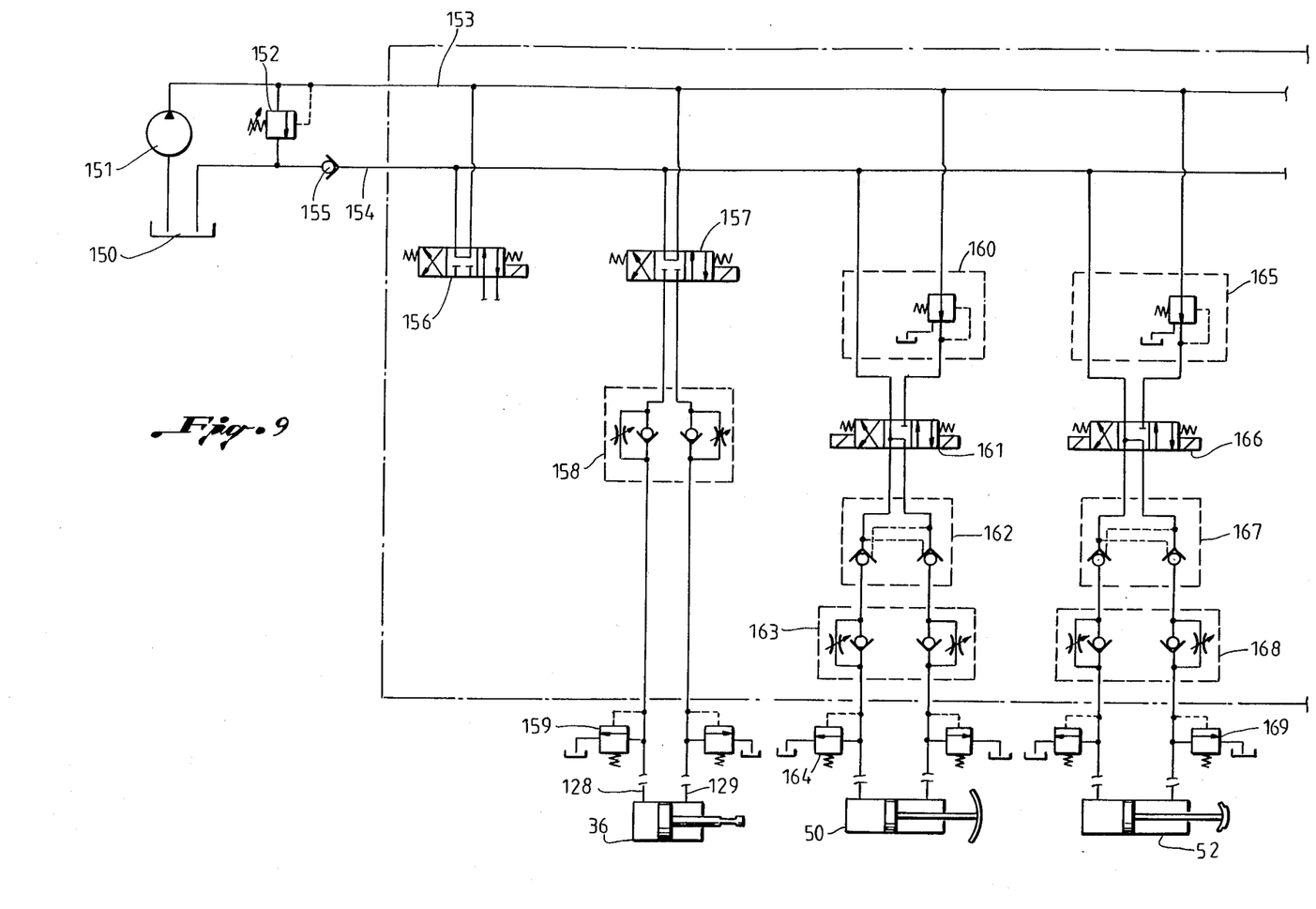
FIG. 9 is a schematic hydraulic diagram for the cylinders and injection system.

The mold segments and injection valve are controlled by a hydraulic system shown schematically in FIG. 9. The hydraulic system has a reservoir for the hydraulic fluid 150. The hydraulic fluid is pressurized and fed through a supply line 153 by a hydraulic pump 151. A relief valve 152 prevents any over pressurizing of the supply line. Back flow in return line 154 is prevented by a check valve 155. An unloading valve 156 permits dumping of the entire system.

Leading to injection valve 36 is a three position, four way blocked center control valve 157 which permits selection of hydraulic fluid flow to either top hydraulic fluid inlet 128 or bottom hydraulic fluid inlet 129. A dual flow control valve 158 restricts hydraulic fluid flow in order to provide smooth and controlled movement of the valve. Finally, relief valves 159 are provided just upstream of injection valve 36.

For control of double acting cylinders 50, the hydraulic system has a pressure reducing valve 160 to control the pressure of the hydraulic pump 151. A three position, four way control valve 161 directs the hydraulic fluid to flow to one or the other side of the piston in double acting cylinder 50. A pilot operated check valve 162 assures that hydraulic fluid is released from one side of the cylinder piston as hydraulic fluid is pumped into the other side of the piston. Dual flow control valves 163 control the flow of hydraulic fluid for controlled movement of the piston in cylinder 50. Finally, relief valves 164 are provided just upstream of cylinder 50.

The hydraulic control system for cylinders 52 have components corresponding to those for the system for cylinders 50, including a pressure reducing valve 165, a three position, four way control valve 166, a pilot operated dual check valve 167, a dual flow control valve 168, and a pair of relief valves 169.

All valves in the foregoing hydraulic control system are solinoid operated. As shown in FIG. 9, all valves are in the blocked or neutral position.

As shown in FIG. 1, mold apparatus 30 may be provided with support wheel assemblies 169 extending from each end to permit the assembly to be rolled through a pipeline by manually pushing or pulling it. However, it is contemplated that mold apparatus 30 be moved through a pipeline by a wheeled power unit 170 as shown in FIG. 4. The power unit will contain a hydraulic drive motor 172 to power a drive wheel in order to move the apparatus through the pipeline. It is also contemplated that the power unit contain the hydraulic control valves 174 for controlling the hydraulic system for apparatus 30 and a mixer 176 for mixing a prepolymer and a hydrogen active chain extender to form the urethane which enters the injection valve.

Power unit 170 can be connected to apparatus 30 by an appropriate linkage 178. In addition, a support wheel assembly 180 may be connected to the opposite end of apparatus 30 to support that end of the apparatus in the pipeline.

OPERATION

The apparatus of the present invention operates as follows. After consecutive pipe sections have been welded together to form a pipeline as described above, mold apparatus 30 is moved into position at a weld by power unit 170. Various methods can be used to properly locate apparatus 30 at a weld. For example, the location of apparatus 30 could simply be measured from the end of the pipeline. Another method would be to provide a sensing device on the apparatus to sense the polarity difference across a weld 12. Also, a switch 182 could be used to sense the end of the pre-coating 16 at a weld. Once apparatus 30 is properly in position at a weld, packers 34 are inflated pneumatically to seal off the area of the pipeline between the packers. When this seal has been made, the space between packers 34 is evacuated to a vacuum of more than 750 millimeters of mercury. This vacuum is held during the injection operation.

At this point, expansible mold segments 32 are expanded into contact with pre-coating 16 as in FIG. 8. Large mold segments 38 are first expanded outwardly by applying hydraulic pressure to cylinders 50. When large mold segments 38 are in contact with the pre-coating, washer 112 will trip limit switch 114. Small mold segments 40 are now permitted to expand outwardly under hydraulic pressure applied to cylinders 52. When small mold segments 40 are fully expanded into contact with large mold segments 38, washer 112 will trip limit switch 116, indicating that the injection process may begin. Any irregularities on the inside surface of pre-coating 16 are accommodated by sealing strips 46. Any misalignment of the mold segments which may occur during the expansion of the mold segments is accommodated by spring plates 62 and assemblies 66, 68. Further, if the pipe is slightly undersized, bevels 42, 44 permit tight engagement between large and small mold segments 38, 40. Small mold segments 40 simply will not be fully expanded to a position flush with the outside surface of the large mold segments.

With the large and small mold segments 38, 40 expanded against the pre-coating, an annular space 184 is defined by the outside surface of the mold segments, the ends of the pre-coatings 16, and the inside surface 22 of the pipeline. It is into this annular space that the urethane coating will be injected.

At this point, the injection process can begin. In the injection system shown, a castable urethane is the injected material. As shown in FIG. 5, the injection valve is in its initial closed position. Castable urethane enters central passage 134 through supply passage 138 and is directed out through waste passage 142. Mixer 176 and the lines connecting the mixer to valve 120 will initially contain solvent from a previous joint injection. Thus, at the start of the urethane injection cycle, the remaining solvent and mixed urethane is displaced through passage 134 and out waste removal passage 142 until a steady state urethane stream is achieved at the injection valve. At that time, the valve is opened to the position shown in FIG. 6 by supplying hydraulic pressure to cylinder 126 through inlet 129.

In the valve open position, the mixed castable urethane is directed into annular space 184. Because a vacuum is maintained in the space between packers 34 during the entire injection operation, the annular space is completely filled by the urethane. Pressure sensor 118 senses a pressure rise as the annular space 184 is completely filled, signaling the valve to be closed to the position shown in FIG. 5 by supplying hydraulic pressure through inlet 128.

During the injection operation, solvent is applied into valve 120 through solvent supply passage 140 and exits through waste removal passage 142. The valve is thereby cleaned of mixed urethane.

As a final step, solvent is injected at the mixer to wash the remaining urethane out of the mixer, the feed hoses, and the valve to the waste tank. This is done with the valve in the closed position shown in FIG. 5.

After injection has been completed and the elastomer has cured to a sufficient strength to permit demolding, mold segments 38, 40 can be retracted to the position shown in FIG. 8A and packers 34 can be deflated. Small mold segments 40 are retracted first by supplying hydraulic pressure to cylinders 52. When small mold segments 40 are fully retracted, washers 102 trip retraction limit switches 117. At that point, large mold segments 38 can be retracted. When large mold segments 38 have been fully retracted, washers 102 trip limit switches 115, signaling that all mold segments are fully retracted.

With the mold segments retracted, mandrel assembly 30 can be moved to another weld area in the pipeline. It is important that the outer dimensions of assembly 30 permit it to retract to such a size that it can be powered around bends in pipeline 14. Such bends may be field formed to a radius as small as about twenty times the outside diameter of the pipe for sizes up to and including 36.0 O.D. inches or to a radius of 60 feet for larger sizes of pipe.

After the urethane has been injected into annular space 184, it bonds to inner surface 22 of the pipe, to the specially configured backup ring 26, if used, and also to the profiled ends of pre-coating 16. Thus, a continuous and smooth internal coating is achieved, even though the pipe sections have been welded together.

The foregoing description has been directed to particular embodiments of the invention in accordance with the requirements of the patent statutes for the purposes of illustration and explanation. It will be apparent, however, to those skilled in this art that many modifications and changes in the apparatus and processes set forth will be possible without departing from the scope and spirit of the invention. It is intended that the following claims be interpreted to embrace all such modifications and changes.

What is claimed is:

1. An apparatus for coating the inside surface of a pipeline in a weld area joining consecutive pipe sections in which each pipe section has been pre-coated along its length to the exclusion of the weld area, comprising:
    a. a mold unit having a generally cylindrical molding surface comprising a plurality of expansible and retractable arcuate mold segments;
    b. means for expanding the mold segments into engagement with the pre-coated inner surface of the pipe sections adjacent the weld area to form an enclosed annular space between the ends of the pre-coating;
    c. means for injecting a coating material into the annular space in order to fill the annular space and provide with the pre-coating a continuous coating inside the pipeline;
    d. means for retracting the mold segments after injection; and
    e. means for evacuating the annular space to enhance injection of coating material into the annular space, comprising a pair of circular packer plates each substantially filling the circular cross section of the pipeline, the packer plates being spaced apart along the axis of the pipeline a distance greater than the uncoated weld area, an inflatable ring-shaped packer positioned around the circumference of each packer plate which can be inflated to sealingly engage the pre-coated inner surface of the pipeline, and means for drawing a vacuum on the inner volume of the pipeline between the packers.

2. An apparatus for coating the inside surface of a pipeline in a weld area joining consecutive pipe sections in which each pipe section has been pre-coated along its length to the exclusion of the weld area, comprising:
    a. a mold unit having a generally cylindrical molding surface comprising a plurality of expansible and retractable arcuate mold segments;
    b. means for expanding the mold segments into engagemnt with the pre-coated inner surface of the pipe sections adjacent the weld area to form an enclosed annular space between the ends of the pre-coating;
    c. means for injecting a coating material into the annular space in order to fill the annular space and provide with the pre-coating a continuous coating inside the pipeline;
    d. means for retracting the mold segments after injection; and
    e. seal means extending around the molding surface at each opposed end of the molding surface for sealing against the pre-coating on the inner surfaces of the pipe sections on opposed sides of the weld area.

3. The apparatus of claim 2, further comprising a mobile unit associated with the mold unit, the mobile unit having components for supplying coating chemicals, compressed air, vacuum, and hydraulic and electric power to the mold unit.

4. The apparatus of claim 2, wherein the plurality of arcuate cylindrical mold segments comprises:
    a. a first set of alternating relatively large arcuate cylindrical mold segments, the outer combined arcuate surfaces of the segments comprising a substantial portion of a circle; and
    b. a second set of relatively small arcuate cylindrical mold segments arranged alternatingly between the relatively large cylindrical segments.

5. The apparatus of claim 4, wherein:
    a. the relatively small cylindrical segments are retractable to a position radially inwardly of the retracted position of the relatively large cylindrical segments;
    b. the longitudinal edges of the relatively small cylindrical segments are beveled; and
    c. the longitudinal edges of the relatively large cylindrical segments are beveled to snugly and sealingly engage the longitudinal edges of the relatively small cylindrical segments when the molding surface is in contact with the pre-coated pipe.

6. An apparatus for coating the inside surface of a pipeline in a weld area joining consecutive pipe sections in which each pipe section has been pre-coated along its length to the exclusion of the weld area, comprising:
    a. a mold unit having a generally cylindrical molding surface comprising a plurality of expansible and retractable arcuate mold segments;
    b. means for expanding the mold segments into engagement with the pre-coated inner surface of the pipe sections adjacent the weld area to form an enclosed annular space between the ends of the pre-coating;
    c. means for injecting a coating material into the annular space in order to fill the annular space and provide with the pre-coating a continuous coating inside the pipeline; and
    d. means for retracting the mold segments after injection, wherein the expanding and retracting means comprises a radially arranged doouble acting hydraulic cylinder located at opposed ends of each cylindrical mold segment, each end of a cylindrical mold segment being mounted on the end of the reciprocating piston rod associated with each cylinder, each cylinder being rigidly mounted on a central mounting base.

7. An apparatus for coating the inside surface of a pipeline in a weld area joining consecutive pipe sections in which each pipe section has been pre-coated along its length to the exclusion of the weld area, comprising:

a. a mold unit having a generally cylindrical molding surface comprising a plurality of expansible and retractable arcuate mold segments;

b. means for expanding the mold segments into engagement with the pre-coated inner surface of the pipe sections adjacent the weld area to form an enclosed annular space between the ends of the pre-coating;

c. means for injecting a coating material into the annular space in order to fill the annular space and provide with the pre-coating a continuous coating inside the pipeline; and d. means for retracting the mold segments after injection, the molding surface having an outer diameter when retracted that is related to its length such that the apparatus can be passed through typical field bends in a pipeline.

8. An apparatus for coating the inside surface of a pipeline in a weld area joining consecutive pipe sections in which each pipe section has been pre-coated along its length to the exclusion of the weld area, comprising:

a. a mold unit having a generally cylindrical molding surface comprising a plurality of expansible and retractable arcuate mold segments;

b. means for expanding the mold segments into engagement with the pre-coated inner surface of the pipe sections adjacent the weld area to form an enclosed annular space between the ends of the pre-coating;

c. means for injecting a coating material into the annular space in order to fill the annular space and provide with the pre-coating a continuous coating inside the pipeline;

d. means for retracting the mold segments after injection; and e. remotely operable motive means for moving the apparatus through a pipeline, the motive means having retractable wheels to be extended into engagement with the inner walls of the pipeline during movement of the apparatus and to be retracted during the injection operation.

9. An apparatus for coating the inside surface of a pipeline in a weld area joining consecutive pipe sections in which each pipe section has been pre-coated along its length to the exclusion of the weld area, comprising:

a. a movable mold unit having a generally cylindrical molding surface comprising a plurality of expansible and retractable arcuate mold sgments, each mold segment having opposed end portions contactable with the pre-coating on the inner surfaces of the pipe sections on opposed sides of the weld area;

b. means for expanding the mold segments into engagement with the pre-coated inner surface of the pipe sections adjacent the weld area to form an enclosed annular space bounded by the ends of the pre-coating, the uncoated interior surface of the pipe sections at the weld area, and the mold;

c. means for injecting a coating material into the annular space in order to fill the annular space and provide with the pre-coating a continuous coating inside the pipeline;

d. means for retracting the mold segments after injection sufficiently to permit the mold to be removed from the pipeline or moved to another weld area therein; and e. means for evacuating the annular space to enhance injection of coating material into the annular space, the evacuating means comprising a pair of circular packer plates each substantially filling the circular cross section of the pipeline, the packer plates being spaced apart along the axis of the pipeline a distance greater than the uncoated weld area, an inflatable ring-shaped packer positioned around the circumference of each packer plate which can be inflated to sealingly engage the pre-coated inner surface of the pipeline, and means for drawing a vacuum on the inner volume of the pipeline between the packers.

10. An apparatus for coating the inside surface of a pipeline in a weld area joining consecutive pipe sections in which each pipe section has been pre-coated along its length to the exclusion of the weld area, comprising:

a. a movable mold unit having a generally cylindrical molding surface comprising a plurality of expansible and retractable arcuate mold segments, each mold segment having opposed end portions contactable with the pre-coating on the inner surfaces of the pipe sections on opposed sides of the weld area;

b. means for expanding the mold segments into engagement with the pre-coated inner surface of the pipe sections adjacent the weld area to form an enclosed annular space bounded by the ends of the pre-coating, the uncoated interior surface of the pipe sections at the weld area, and the mold;

c. means for injecting a coating material into the annular space in order to fill the annular space and provide with the pre-coating a continuous coating inside the pipeline;

d. means for retracting the mold segments after injection sufficiently to permit the mold to be removed from the pipeline or moved to another weld area therein; and e. seal means extending around the molding surface at each opposed end of the molding surface for sealing against the pre-coating on the inner surfaces of the pipe sections on opposed sides of the weld area.

11. An apparatus for coating the inside surface of a pipeline in a weld area joining consecutive pipe sections in which each pipe section has been pre-coated along its length to the exclusion of the weld area, comprising:

a. a movable mold unit having a generally cylindrical molding surface comprising a plurality of expansible and retractable arcuate mold segments, each mold segment having opposed end portions contractable with the pre-coating on the inner surfaces of the pipe sections on oposed sides of the weld area;

b. means for expanding the mold segments into engagement with the pre-coated inner surface of the pipe sections adjacent the weld area to form an enclosed annular space between the ends of the pre-coating;

c. means for injecting a coating material into the annular space in order to fill the annular space and provide with the pre-coating a continuous coating inside the pipeline; and d. means for retracting the mold segments after injection sufficiently to permit the mold to be removed from the pipline or moved to another weld area therein wherein the expanding and retracting means comprises a radially arranged double acting hydraulic cylinder located at opposed ends of each cylindrical mold segment, each end of a cylindrical mold segment being mounted on the end of the reciprocating piston rod associated with each cylinder, each cylinder being rigidly mounted on a central mounting base.

12. An apparatus for coating the inside surface of a pipeline in a weld area joining consecutive pipe sections in which each pipe section has been pre-coated along its length to the exclusion of the weld area, comprising:
   a. a movable mold unit having a generally cylindrical molding surface comprising a plurality of expansible and retractable arcuate mold segments, each mold segment having opposed end portions contactable with the pre-coating on the inner surfaces of the pipe sections on opposed sides of the weld area;
   b. means for expanding the mold segments into engagement with the pre-coated inner surface of the pipe sections adjacent the weld area to form an enclosed annular space bounded by the ends of the pre-coating, the uncoated interior surface of the pipe sections at the weld area, and the mold;
   c. means for injecting a coating material into the annular space in order to fill the annular space and provide with the pre-coating a continuous coating inside the pipeline; and
   d. means for retracting the mold segments after injection sufficiently to permit the mold to be removed from the pipeline or moved to another weld area therein, the molding surface having an outer diameter when retracted that is related to its length such that the apparatus can be passed through typical field bends in a pipeline.

13. An apparatus for coating the inside surface of a pipeline in a weld area joining consecutive pipe sectons in which each pipe section has been pre-coated along its length to the exclusion of the weld area, comprising:
   a. a movable mold unit having a generally cylindrical molding surface comprising a plurality of expansible and retractable arcuate mold segments, each mold segment having opposed end portions contractable with the pre-coating on the inner surfaces of the pipe sections on opposed sides of the weld area;
   b. means for expanding the mold segments into engagemnt with the pre-coated inner surface of the pipe sections adjacent the weld area to form an enclosed annular space bounded by the ends of the pre-coating, the uncoated interior surface of the pipe sections at the weld area, and the mold;
   c. means for injecting a coating material into the annular space in order to fill the annular space and provide with the pre-coating a continuous coating inside the pipline;
   d. means for retracting the mold segments after injection sufficiently to permit the mold to be removed from the pipeline or moved to another weld area therein; and
   e. remotely operable motive means for moving the apparatus through a pipeline, the motive means having retractable wheels to be extended into engagement with the inner walls of the pipeline during movement of the apparatus and to be retracted during the injection operation.

14. An apparatus for coating the inside surface of the weld areas at the adjoining ends of two pipe sections in which each pipe section has been pre-coated along its length to the exclusion of the weld area, comprising:
   a. a mold unit comprising a plurality of expansible and retractable arcuate mold segments which upon expansion define a generally cylindrical molding surface, which is continuous with the inner surface of the pre-coating and which defines an enclosed annular space bounded by the adjacent ends of the two pre-coatings, the inside surface of the two adjacent weld areas and said molding surface, the generally cylindrical molding surface retaining its generally cylindrical shape during the operation of injecting a coating material into the annular space;
   b. means for injecting a coating material into the annular space to fill the annular space and provide with the two pre-coatings a continuoous coating;
   c. means for expanding and retracting the mold segments; and
   d. seal means extending around the molding surface at each opposed end of the molding surface for sealing against the pre-coating on the inner surfaces of the pipe sections on opposed sides of the weld area.

15. The apparatus of claim 14, wherein the mold segments are steel or aluminum.

16. An apparatus for coating the inside surface of the weld area surrounding a weld joining two adjacent pipe section in which each pipe section has been pre-coated along its length to the exclusion of the weld area, comprising:
   a. a mold unit movable within the pipe sections comprising a plurality of expansible and retractable arcuate, substantially rigid mold segments which upon expansion form a generally cylindrical molding surface, each mold segment having opposed end portions contactable with the pre-coating on the inner surfaces of the pipe sections on opposite sides of the weld area;
   b. means for expanding the mold segments into engagement with the pre-coated inner surfaces of the pipe sections adjacent the weld area to form an enclosed annular space bounded by the ends of the pre-coating, the uncoated interior surface of the pipe sections at the weld area, and the mold;
   c. means for injecting a coating material into the annular space in order to fill the annular space and provide with the pre-coating a continuous coating inside the pipe sections; and
   d. seal means extending around the molding surface at each opposed end of the molding surface for sealing against the pre-coating on the inner surfaces of the pipe sections on opposed sides of the weld area.

* * * * *